Aug. 30, 1966  E. S. JOHNSON  3,269,071
GYPSUM COMPOSITION AND BUILDING CONSTRUCTION
Original Filed June 27, 1960  2 Sheets-Sheet 1

INVENTOR.
Elmer S. Johnson
BY

United States Patent Office 3,269,071
Patented August 30, 1966

3,269,071
GYPSUM COMPOSITION AND BUILDING
CONSTRUCTION
Elmer S. Johnson, deceased, late of Arlington Heights,
Ill., by Lucille G. Johnson, executrix, Arlington Heights,
Ill., assignor to United States Gypsum Company, Chicago, Ill., a corporation of Illinois
Continuation of application Ser. No. 38,931, June 27,
1960. This application Sept. 26, 1963, Ser. No. 313,141
3 Claims. (Cl. 52—338)

This application is a continuation of co-pending application Serial No. 38,931, filed June 27, 1960, and now abandoned.

This invention relates to new and improved gypsum compositions and to poured monolithic gypsum roof and floor structures made therefrom.

Gypsum has long been utilized in the construction of poured reinforced roof structures which are fireproof, insulating and low cost. Roof and floor structures of this type made from a monolithic gypsum cast placed over sheet-like members resting on spaced parallel supports are disclosed in U.S. Patent No. 2,233,054.

Poured monolithic roof structures of the type described above and utilizing nonreinforcing aggregates, such as expanded perlite in the gypsum compositions, are also known. One advantage of using lightweight expanded aggregates, such as perlite and vermiculite, is that superior insulating and handling properties are obtained in the production of cast gypsum objects along with the further advantage of reduced weight. This of course is particularly valuable in roof deck structures, particularly where the structure is used as the ceiling for the floor below, or as a flooring base. It may also be appreciated that the use of such aggregates makes the roof structure more fireproof.

One difficulty that has been observed in the case of lightweight nonreinforcing mineral aggregates, such as expanded perlite or wood in poured gypsum roof structures, is the pronounced sagging of the gysum roof in the area between the parallel supports. Such sagging, of course, causes stresses in the cast gypsum structure and ultimately results in cracks.

Accordingly, it is an object of the present invention to provide an improved gypsum composition of superior rigidity.

Another object is the provision of lightweight, low cost monolithic cast gypsum roof and floor structures which have reduced sagging characteristics.

A further object is the provision of a cast gypsum composition having improved rigidity.

A still further object is the provision of a low cost poured gypsum roof structure that is resistant to cracking.

These and other objects of the present invention may be seen from the following specification, drawing and appended claims.

In one broad form the present invention comprises a dry pulverulent calcined gypsum plaster mix, containing from 0.25 to about 5 weight percent Portland cement based upon said calcined gypsum and at least about 2 cubic feet of a thermally expanded mineral aggregate per 100 pounds of calcined gypsum.

While the proportions of Portland cement are broadly as indicated above, a most preferred range of Portland cement is from about 0.5 to about 2.5 weight percent on a dry calcined gypsum basis.

The thermally expanded mineral aggregate may be exemplified by perlite or thermally expanded obsidian rock or a thermally expanded mica, such as vermiculite, of which perlite is the most preferred species. Broadly the thermally expanded mineral aggregate should be present in the dry mix in an amount of from 2 to 6 cubic feet per 100 pounds of calcined gypsum and preferably from 2 to 4 cubic feet on the same basis.

It should be understood that the calcined gypsum referred to herein is the commercial gypsum product containing various impurities, although a pure calcined gypsum containing 100% calcium sulfate hemihydrate may also be used.

A further embodiment of this invention is the case hydrated set gypsum composition made from the above described gypsum mix. As may be understood, the percentages of the components are adjusted to the extent that the calcined gypsum (also sometimes hereinafter termed "stucco") or calcium sulfate hemihydrate is converted to the dihydrate or $CaSO_4 \cdot 2H_2O$, in the set product. Accordingly, in the cast set gypsum composition the Portland cement component may be broadly expressed as being present in an amount of from 0.20 to 4.2% on a hydrated, set gypsum basis and preferably from 0.4 to 2.1% on the same basis. Likewise the perlite or equivalent should be present in an amount of from about 1.7 to about 5 cubic feet per 100 pounds of hydrated and set gypsum crystals, and in the most preferred instance from about 1.7 to 3.4 cubic feet per 100 pounds of hydrated gypsum.

A monolithic gypsum roof and floor construction is also contemplated as a further embodiment of this invention, said construction comprising a plurality of bulb-T strips supported in spaced parallel relation preformed plasterboard or formboard panels marginally supported on opposed strip flanges and spanning the space between the bulb-T strips, a reticulated metal reinforcing mesh overlying said bulb-T strips, and a layer of a set gypsum composition disposed in overlying relation to said formboards to cover the reinforcing mesh and strips to provide a monolithic encasement therefor; said gypsum composition comprising a set matrix of hydrated and set gypsum crystals containing from 0.2 to 4.2% by weight of Portland cement based on said set gypsum and from about 1.7 to 5 cubic feet of a thermally expanded mineral aggregate per 100 pounds of set gypsum.

For a more complete understanding of this invention reference should be had to the drawings, wherein.

Figure 1:
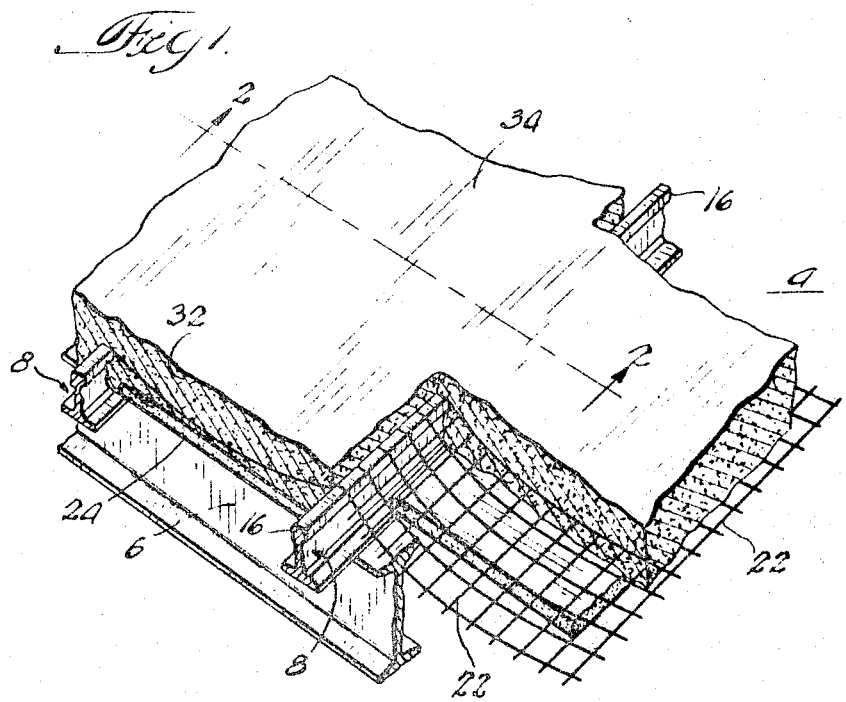
FIGURE 1 is a fragmentary perspective view, partially in section, of a monolithic roof or floor structure, illustrating one embodiment of this invention.
Figure 2:
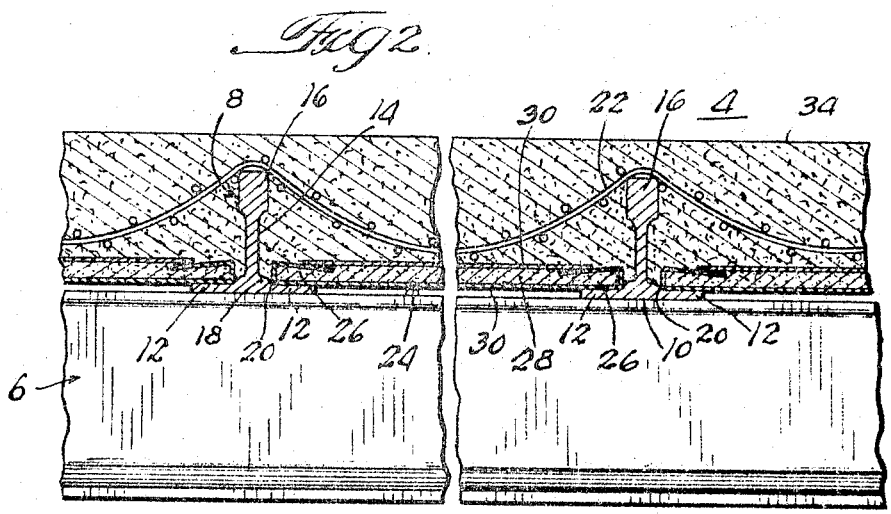
FIG. 2 is a transverse sectional view through the embodiment illustrated in FIG. 1, taken along the line 2—2 of FIG. 1.

Referring to the drawing in detail, the embodiment illustrated comprises a roof or floor construction 4 supported on purlins 6 which may be of any suitable type, such as an I-beam as illustrated, or the like. Special steel bulb-T strips 8 are transversely supported on the purlins 6 in substantially parallel and spaced relation. If desired the bulb-T strips 8 may be affixed to the purlins 6 by means of welding or clips (not shown).

The bulb-T strips 8 comprise a base 10 forming wide flanges 12 which extend laterally from a central vertical web 14. The web 14 terminates in a so-called bulb portion 16 which may be of any suitable shape, but is preferably substantially rectangular, as shown. The bulb-T strip is provided adjacent the intersection of the base and web with fillet-like portions or ribs 18, the outer edge thereof forming elongated shoulders 20 running longitudinally along the entire length of the bulb-T strip.

In the embodiment illustrated, a reticulated open metal reinforcing mesh 22 is shown suspended overlying the bulbs 16 of the bulb-T strips 8.

Plasterboard formboards 24 are illustrated spanning the spaces between the bulb-T strips and supported at their marginal edge portions 26 by the flanges 12 of the bulb-T strips. These formboards are, as illustrated, plasterboard having a central core 28 of set gypsum or other material encased in paper cover sheets 30. A gypsum composition 32 is poured over the structure formed by the bulb-T strips, formboards and reticulated metal reinforcing means to form a uniform monolithic encasement, substantially as illustrated. Formboards other than plasterboard may also be used, such as formboards made from disintegrated wood, such as fiberboard or ceramic fibers, such as blown or drawn glass or mineral wool.

The upper surface 34 of the illustrated floor or roof construction may be utilized as a base for a roofing material or a flooring structure.

Figure 3:
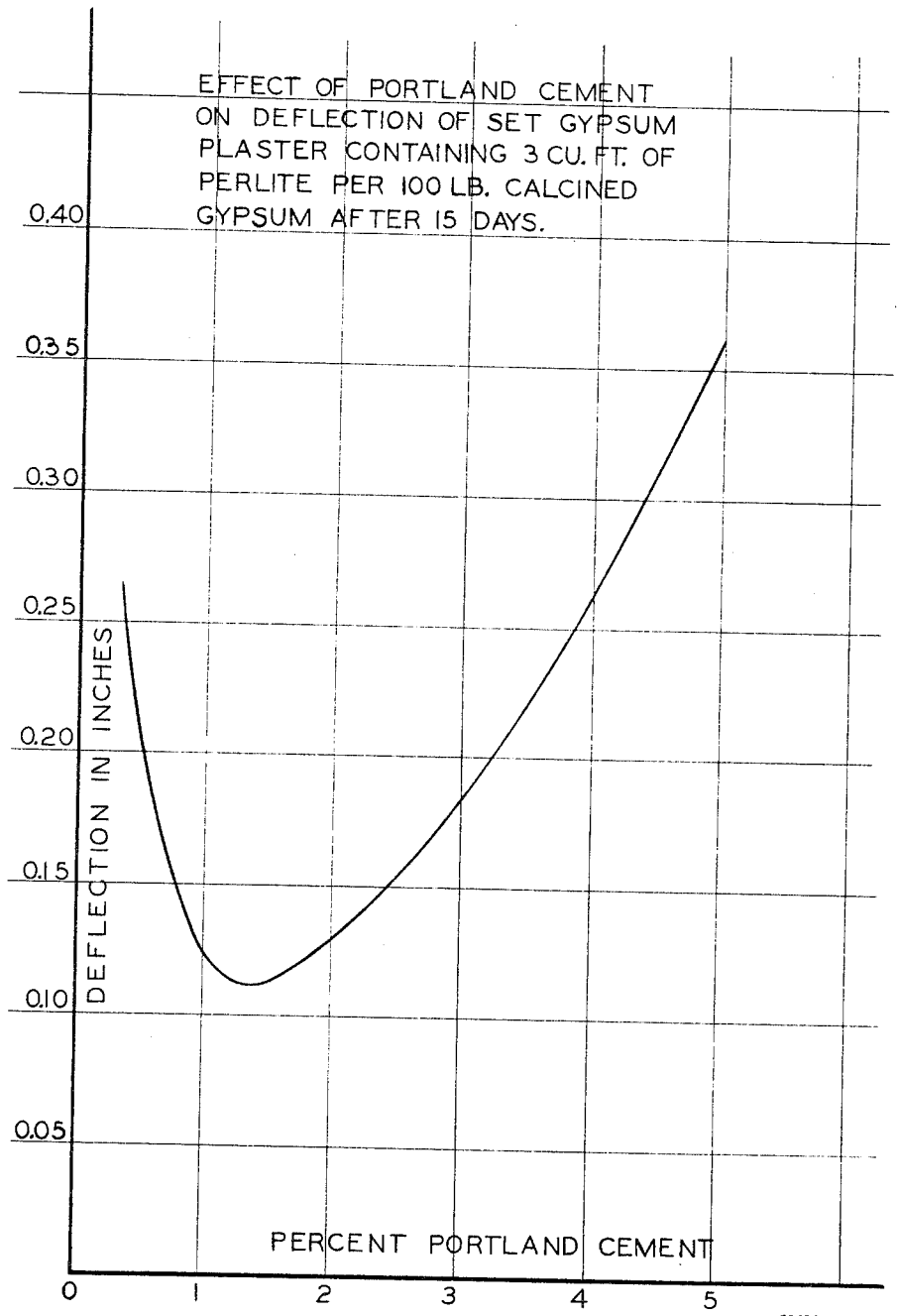
FIG. 3 is a curve illustrating the effect of Portland cement on the gypsum-perlite cast objects.

In FIG. 3 the curve illustrates the deflection in inches of gypsum casts containing 3 cubic feet of perlite per 100 pounds dry gypsum and various amounts of Portland cement (on a dry gypsum basis). The deflection in inches of a cast bar 2 x 3 inches, 32 inches long, is shown. The supports are spaced at 30 inches. The test was run at 90% relative humidity.

A typical gypsum composition of the type contemplated herein comprises the following dry ingredients:

Expanded perlite, cu. ft. _____ 60
Calcined gypsum, lbs. _____ 2,000
Portland cement, lbs. _____ 10
Retarder (commercial), as required to give the desired set time.

Commercial retarder is well known in the industry and one type is prepared by treating a keratinaceous material with an alkaline solution and adding a carrier so that the material is a dry powder. Usually not more than 6 ounces per ton of gypsum is required.

The above dry mix is formed into a slurry by the addition of water, and the slurry is then poured upon the roof structure as described above, forming a substantially flat deck or upper surface. The set time in commercial operation is usually from 25 to about 35 minutes. As indicated above, the resulting structure is unusually resistant to sagging and concomitant cracking.

The following table will illustrate the beneficial effect of the incorporation of small amounts of Portland cement in gypsum-mineral aggregate compositions:

From the foregoing examples it may be observed that the sagging of gypsum-perlite set plaster casts is very markedly reduced by the addition of small amounts of Portland cement. Note that up to a certain point, which is close to 1%, an increase in the percentage of Portland cement gives a decrease or improvement in the deflection. This is shown in FIG. 3 of the drawings. Note also that excellent results were obtained when the Portland cement was substantially hydrated to a moisture content of about 7.7%, estimated to be about 75% hydration. The particular hydrated Portland cement utilized in the foregoing table was prepared by mixing Portland cement (100 parts) with water (50 parts) and heating the slurry formed in a water bath (ca. 212° F.) for 4–6 hours. The product was stored in a sealed container for 3 days, dried at 110° F. to constant weight and then ground.

A marked decrease in sagging is also obtained when the Portland cement is added to a mix containing expanded vermiculite as well as expanded perlite.

It should be understood that the consistency of the mix may vary; consistency is understood to mean the quantity of water in cubic centimeters added to the dry gypsum composition. Thus the consistency may vary from 80 to 140 cubic centimeters of water per 100 grams of gypsum mix. Of course, ratio may be expressed in other terms. The improvements obtained by the addition of Portland cement are observable, however, at comparable consistencies of the various compositions.

While broadly the amount of Portland cement utilized has been indicated as from 0.25 to 5.0% (dry calcined gypsum basis) it should be understood that the most preferred range is from 0.5 to 2.5% on the same basis, since it has been found that superior wet bonding between the gypsum composition and the formboards, when the latter are gypsum plasterboards, is obtained at this level as compared to higher amounts of Portland cement, as well as resulting in minimum sagging.

What is claimed in:

1. An improved lightweight monolithic poured gypsum roof and floor construction having a plurality of spaced roof and floor supporting means having a vertical web portion and subtending flanges, formboards disposed between said supporting means and supported at their marginal portions by the said subtending flanges, an open reticulated reinforcing means overlying said supporting

TABLE I

| Aggregate Type | Amount/100 lbs. plaster [1] | Percent Portland Cement [1] | Consistency cc. water/100 gms. gypsum plaster | Wet Density lbs./ft.[3] | 1 hr. wet compressive strength, lbs./in.[2] | Sagging [2] inches 15 days |
|---|---|---|---|---|---|---|
| Expanded Perlite | 2 cu. ft. | 0 | 120 | 73.2 | 243 | .670 |
| Do | do | 1.0 | 130 | 71.6 | 215 | .135 |
| Do | 3 cu. ft. | 0 | 90 | 72.4 | 393 | .229 |
| Do | do | 0 | 120 | 70.0 | 204 | .632 |
| Do | do | 0.5 | 95 | 71.0 | 423 | .057 |
| Do | do | 0.5 | 105 | 71.0 | 352 | .068 |
| Do | do | 0.5 | 120 | 69.0 | 251 | .113 |
| Do | do | 0.5 | 130 | 69.0 | 216 | .145 |
| Do | do | 0.5 | 140 | | 190 | .210 |
| Do | do | 1.0 | 105 | 69.7 | 352 | .044 |
| Do | do | 1.0 | 120 | 68.7 | 257 | .095 |
| Do | do | 1.0 | 130 | 69.1 | 206 | .125 |
| Do | do | 1.0 | 140 | 68.5 | 191 | .124 |
| Do | do | [3] 1.0 | 105 | 70.5 | 246 | .058 |
| Do | do | [3] 1.0 | 140 | 68.7 | 168 | .102 |
| Do | do | 2.5 | 140 | 69.5 | 190 | .153 |
| Do | do | 5.0 | 140 | 70.0 | 126 | .353 |
| Do | 6 cu. ft. | 0 | 125 | 63.4 | 138 | 1.705 |
| Do | do | 1.0 | 130 | 65.7 | 168 | .059 |
| Expanded Vermiculite | 3 cu. ft. | 0 | 100 | 77.5 | 156 | 2.988 |
| Do | do | 1.0 | 110 | 75.5 | 196 | .559 |

[1] Dry calcined gypsum basis.
[2] Sagging is based upon 2" high x 3" wide x 32" long bars and placed, without drying, on supports 30" apart, immediately after setting, for 15 days in an atmosphere of high humidity at room temperature, which averaged about 70° F. The specimens were enclosed in a large plastic bag with a pan of water underneath the specimens to maintain close to a moisture saturated atmosphere surrounding the specimens.
[3] Hydrated.

means and formboards and spanning the spaces between the vertical portions of the supporting means, and a set gypsum overlying the formboards and encasing the reinforcing means and vertical portions of the supporting means to encase the same and bonded thereto in a monolithic structure, the set gypsum composition being comprised of an admixture of water and a dry gypsum mix consisting essentially of calcined gypsum, from 0.25 to 5.0 weight percent Portland cement on a calcined gypsum basis and from 2 to 6 cubic feet of perlite aggregate per 100 pounds of calcined gypsum, said admixture forming a gypsum slurry further characterized in having a set time of up to about 35 minutes.

2. A roof and floor construction according to claim 1 wherein the Portland cement is present in an amount of from 0.5 to 2.5 weight percent.

3. A roof and floor construction according to claim 1 wherein the perlite aggregate is present in an amount of from 2 to 4 cubic feet per 100 pounds of calcined gypsum.

References Cited by the Examiner
UNITED STATES PATENTS

| | | | |
|---|---|---|---|
| 1,923,370 | 8/1933 | Hansen | 106—89 |
| 2,174,581 | 10/1939 | Hoge | 52—338 |
| 2,212,811 | 8/1940 | Hann | 106—89 |
| 2,233,054 | 2/1941 | Heeren | 52—338 |
| 2,377,491 | 6/1945 | Goodrich et al. | 106—86 |
| 2,406,757 | 9/1946 | Gardener | 106—110 |
| 2,501,699 | 3/1950 | Stecker | 252—378 |
| 2,715,583 | 8/1955 | Ziegler | 106—110 |

FRANK L. ABBOTT, *Primary Examiner.*

HENRY C. SUTHERLAND, JACOB L. NACKENOFF, *Examiners.*

J. L. RIDGILL, *Assistant Examiner.*